(12) United States Patent
Prosyk (10) Patent No.: US 8,280,201 B2
(45) Date of Patent: Oct. 2, 2012

(54) TRAVELING WAVE MACH-ZEHNDER OPTICAL DEVICE

(75) Inventor: Kelvin Prosyk, Luskville (CA)

(73) Assignee: COGO Oprtonics, Inc., Boulder, CO (US)

( * ) Notice: Subject to any disclaimer, the term of this patent is extended or adjusted under 35 U.S.C. 154(b) by 255 days.

(21) Appl. No.: 12/633,276

(22) Filed: Dec. 8, 2009

(65) Prior Publication Data
US 2011/0135242 A1    Jun. 9, 2011

(51) Int. Cl.
*G02F 1/035* (2006.01)
*G02B 26/00* (2006.01)
*H04B 10/04* (2006.01)

(52) U.S. Cl. ............... 385/3; 385/2; 385/14; 385/15; 385/50; 385/131; 359/237; 359/238; 359/239; 398/182; 398/183; 398/184

(58) Field of Classification Search ........... 385/1–3, 385/6–10, 14, 39–41; 359/237–238, 245–252, 359/254
See application file for complete search history.

(56) References Cited

U.S. PATENT DOCUMENTS

| | | | |
|---|---|---|---|
| 4,776,657 A * | 10/1988 | Reeder | 385/3 |
| 5,408,544 A | 4/1995 | Seino | |
| 5,524,076 A | 6/1996 | Rolland et al. | |
| 6,212,315 B1 * | 4/2001 | Doerr | 385/31 |
| 6,606,424 B2 | 8/2003 | Ooi et al. | |
| 6,650,458 B1 * | 11/2003 | Prosyk et al. | 359/276 |
| 7,082,237 B2 | 7/2006 | Walker et al. | |
| 7,171,063 B2 * | 1/2007 | Feke et al. | 385/2 |
| 7,409,114 B2 * | 8/2008 | Kondou et al. | 385/2 |
| 7,460,739 B2 * | 12/2008 | Gilardi et al. | 385/8 |
| 7,606,447 B2 | 10/2009 | Wada | |
| 2003/0190107 A1 | 10/2003 | Walker | |
| 2004/0184694 A1 * | 9/2004 | Ridgway et al. | 385/3 |
| 2006/0120655 A1 | 6/2006 | Walker | |
| 2008/0170821 A1 * | 7/2008 | Kissa et al. | 385/14 |

(Continued)

FOREIGN PATENT DOCUMENTS

GB    2361071 A    10/2001

(Continued)

OTHER PUBLICATIONS

Robert G. Walker, High-Speed III-V Semiconductor Intensity Modulators, IEEE Journal of Quantum Electronics, Mar. 1991, pp. 654-667, vol. 27, No. 3, IEEE, US.

(Continued)

*Primary Examiner* — Brian M. Healy
*Assistant Examiner* — Guy Anderson
(74) *Attorney, Agent, or Firm* — Dorr, Carson & Birney, P.C.

(57) ABSTRACT

A Mach-Zehnder modulator has an optical splitting element splitting an input optical signal into two optical signals that are conveyed by two optical waveguide arms, and an optical combining element combining the two optical signals into an output optical signal. Two traveling wave electrodes (TWEs) carry an electrical modulation signal to induce a change in phase of these two optical signals, and include a number of pairs of modulation electrodes positioned adjacent to the waveguide arms. At least some of the electrodes in one waveguide arm have a different shape (e.g., length or width) than the electrodes in the other waveguide arm to alter the effectiveness of the electrodes in inducing a phase change in the two optical signals.

20 Claims, 10 Drawing Sheets

U.S. PATENT DOCUMENTS

2009/0067770 A1* 3/2009 Gilardi et al. .................... 385/2

FOREIGN PATENT DOCUMENTS

GB 2375614 A 11/2002
GB 2384570 A 7/2003

OTHER PUBLICATIONS

Pisu Jiang et al., LiNbO3 Mach-Zehnder Modulators with Fixed Negative Chirp, IEEE Photonics Technology Letters, Oct. 1996, pp. 1319-1321, vol. 8, No. 10, IEEE, US.

I. Betty et al., An Empirical Model for High Yield Manufacturing of 10Gb/s Negative Chirp InP Mach-Zehnder Modulators, IEEE Xplore, Aug. 17, 2009, 3 pages, US.

H. N. Klein et al., 1.55 μm Mach-Zehnder Modulators on InP for optical 40/80 Gbit/s transmission networks, 2006, pp. 171-173, IEEE, US.

P. Bravetti et al., Chirp-Inducing Mechanisms in Mach-Zehnder Modulators and Their Effect on 10 Gb/s NRZ Transmission Studied Using Tunable-Chirp Single Drive Devices, Journal of Lightwave Technology, Feb. 2004, pp. 605-611, vol. 22, No. 2, IEEE, US.

* cited by examiner

TRAVELING WAVE MACH-ZEHNDER OPTICAL DEVICE

BACKGROUND OF THE INVENTION

1. Field of the Invention

The present invention relates generally to the field of optical devices for optical fiber communications systems. More specifically, the present invention discloses a traveling wave Mach-Zehnder modulator providing negative chirp.

2. Statement of the Problem

Mach-Zehnder modulators (MZMs) are commonly used as transmitters in optical fiber communications systems. One critical parameter in such systems is the amount of dynamic shift in the instantaneous frequency of the optical carrier as it is being modulated with data. Typical data symbol rates are in the range of 2.5 GBd to 100 GBd, while typical optical carrier frequencies are in the range of 190 THz to 210 THz. An induced shift in the instantaneous frequency of the carrier is commonly called frequency chirp, or simply chirp, and can be an amount up to 20 GHz or more, to lower or higher frequencies than the optical center frequency. In many modulated signals, particularly those produced by other means such as directly modulated lasers, and especially those employing a modulation format based on on-off keying (OOK) of the optical power, chirp is an unwanted side effect of the modulation process. Since optical fiber is dispersive, the frequency spectrum of the modulated signal is a dominating factor affecting the quality of the signal as it propagates down a fiber.

Among the well known advantages of MZMs is the ability to design it to provide chirp to meet the needs of a specific application. For example, zero chirp (ZC) MZMs, which produce substantially no chirp, are widely available from commercial sources. Other MZMs are designed specifically to produce a chirp which behaves in opposition to the fibre dispersion, thereby extending the length of fiber down which the signal can propagate before experiencing unacceptable degradation. For fibers with positive dispersion, these MZMs are known as negative chirp (NC) MZMs, and are also generally available from a variety of commercial sources. A novel and advantageous design of a Mach-Zehnder optical device capable of a chirped output optical signal, such as a NC MZM, is the subject of this invention.

Figure 1:
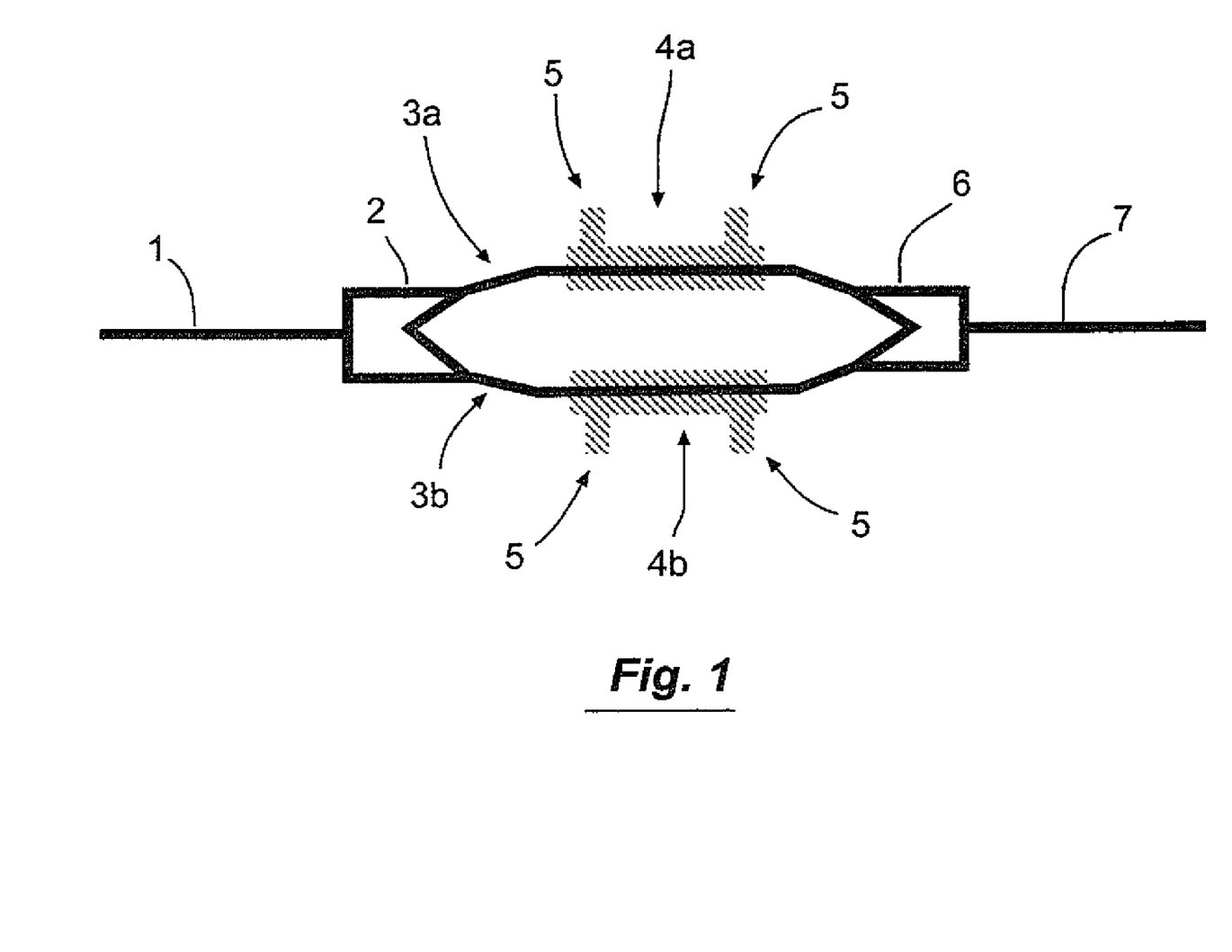
FIG. 1 is a plan view schematic diagram of a prior art Y-junction lumped element MZM disclosed by Yu.

The basic structure of a prior art lumped element InP/InGaAsP Y-junction MZM is shown in FIG. 1, as described for example by Yu in U.S. Pat. No. 5,991,471. It consists of an input optical waveguide 1, connected to a Y-junction coupler 2 which splits the optical signal into two paths 3a and 3b. In each of the two optical paths is a modulation electrode 4a and 4b for shifting the relative optical phase between the two signal paths with the data signals; pads 5 for electrical connection to external modulation signals; a Y-junction coupler 6 which combines the two paths into an output waveguide 7. As described by Yu, there may be an additional means to make direct current (DC) adjustments to the relative phase independent of the modulation signal. Furthermore, Yu teaches that modulation electrodes 4a and 4b may be of different lengths, which can be advantageous for producing an intentional chirp. However, Yu also points out that if modulation electrodes 4a and 4b do have different lengths, the bandwidth of the MZM will be affected in a disadvantageous manner. Yu proposes that the pads 5 can be adjusted to different sizes to provide a capacitive balance to the asymmetric electrodes 4a and 4b. The symbol rate of such lumped element MZM architectures is typically limited to about 10 GBd even without the disadvantageous effect of asymmetric electrodes.

Figure 2:
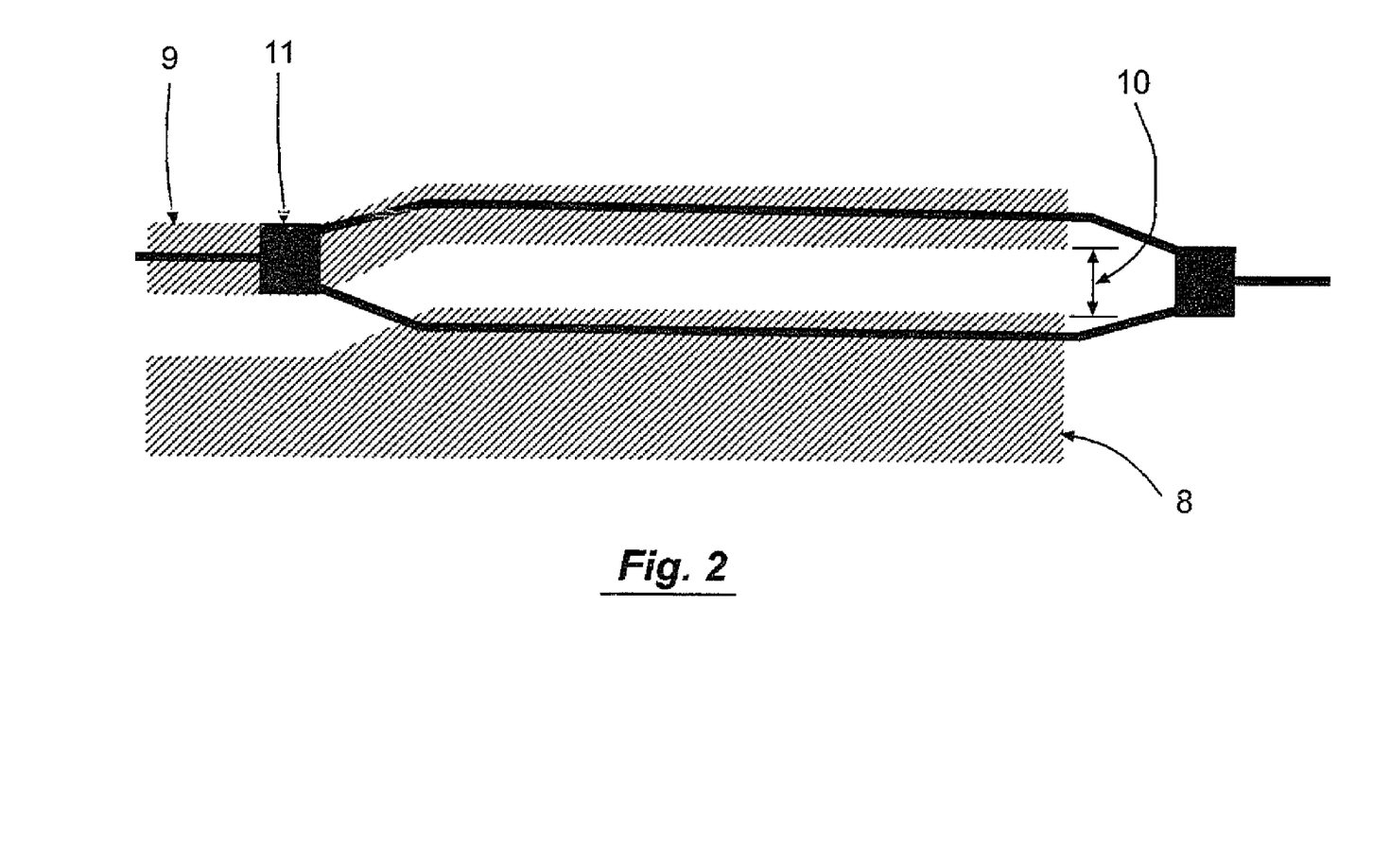
FIG. 2 is a plan view schematic diagram of a prior art MZM where the modulation electrodes are continued to provide a phase modulation prior to amplitude modulation.

Another method of controlling chirp is by separating the amplitude and phase modulation operations. A MZM may be used to modulate the power level. The optical input of the MZM is connected to the optical output of a phase modulator which is also driven by an electrical signal. As shown in FIG. 2, it is known that the modulation electrodes 8 and 9 of the MZM can be continued, with one of them placed over the incoming waveguide, such that the incoming waveguide under the electrode becomes a phase modulator. As taught in U.S. Pat. No. 5,408,544 (Seino), the two electrodes may be traveling wave electrodes (TWE), meaning that they also act as an electrical transmission line and support a radio frequency (RF) electrical mode.

The prior art of modulator disclosed by Seino and depicted in FIG. 2 has a number of disadvantages. If it is designed as a lumped element device then, like the prior art of FIG. 1 with unequal electrode lengths, the bandwidth will disadvantageously affected. If it is designed as a TWE device, a number of problems are present. The modulation efficiency and bandwidth is advantageously affected if the characteristic impedance of the transmission line formed by the modulation electrodes 8 and 9 is matched to the electrical source, typically 50 Ohms. Bandwidth is further advantageously affected if the propagation velocity of the RF mode is substantially the same as the propagation velocity of the optical mode contained in the waveguides. A fully-optimized device, therefore, would have both the impedance and velocities matched simultaneously. Both of these factors are controlled by the dimensions (e.g., gap width, 10) of the modulation electrodes. In devices which rely on fringing electric fields to supply a phase change to the optical signals, such as lithium niobate ($LiNbO_3$), the gap width also determines the modulation efficiency, i.e., how much voltage or how long an electrode is required to provide sufficient phase change. In the prior art of Seino, there is no capability to simultaneously achieve all three optimization goals: impedance, velocity match, and modulation efficiency. Note that typically $LiNbO_3$ modulators are roughly 1-4 cm in length, whereas MZMs made from alternative semiconductor materials, such as indium gallium arsenide phosphide on indium phosphide substrates (InGaAsP/InP), have chips lengths about one tenth that of $LiNbO_3$, 1-4 mm. Materials such as InGaAsP/InP can be designed such that the electrical signal can be delivered efficiently to the optical waveguides without relying on fringing fields. However, doing so causes the modulation electrodes to have a high capacitance, which, in the configuration of FIG. 3 would disadvantageously affect both the bandwidth and modulation efficiency.

A further practical problem in implementing the prior art disclosed by Seino is the splitting means 11. The splitting means 11 is extremely sensitive to manufacturing tolerances and perturbations to the optical phase of the light beam passing through it. Seino does not teach how to avoid applying phase modulation to this sensitive element, thereby affecting the optical loss and/or splitting ratio. Routing the modulation electrode far enough away from the element so that it is unaffected by the electrical signal would cause a change in the RF properties of the electrodes.

Figure 3:
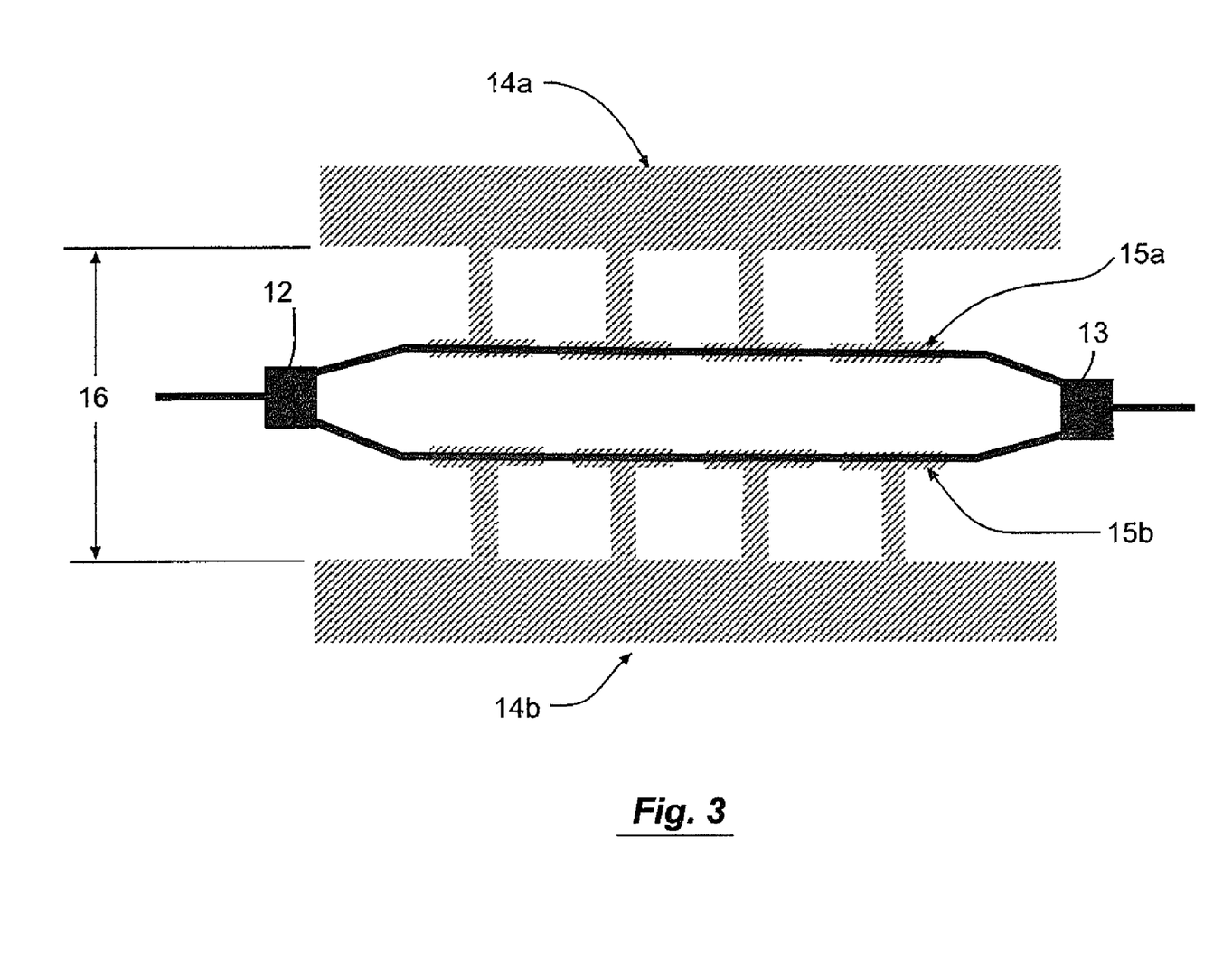
FIG. 3 is a plan view schematic diagram of a prior art traveling wave electrode MZM.

An alternative prior art MZM is shown schematically in FIG. 3, and is described in detail by R. G. Walker, "High-speed III-V semiconductor intensity modulators", *IEEE J. Quantum Electron.*, Vol. 27(3), p. 654, 1991. This architecture is referred to herein as a loaded line traveling wave electrode (LLTWE) MZM. The arrangement is distinguished by the presence of two types of electrically-connected electrodes. First, there is a pair of transmission line electrodes 14 which support a radio frequency (RF) guided mode. Second, modulation phase shifting is provided by a plurality of modulation electrode pairs 15, with one electrode of each pair adjacent to each parallel MZM arm. The modulation electrode pairs are arranged periodically end-to-end along the length of the MZM arms. Having transmission line electrodes separate from modulation electrodes is extremely advantageous in that it allows the transmission line properties to be decoupled from the modulation electrode properties. The modulation electrodes now provide a periodic capacitive load to the transmission line electrodes. Using this architecture, it is possible to simultaneous match the TWE impedance to a modulation signal source, and to match the propagation velocities of the RF and optical guided modes, without a direct impact on the efficiency of the modulation electrodes. A further distinguishing feature compared to Yu of some MZMs of this type is the ability to operate in series push-pull configuration. As described in the Walker article, the TWE MZM can be configured such that pairs of modulation sections (one of each pair on each of the two MZM arms) are electrically in series, but affect the phase of the optical mode in the two arms in an anti-parallel fashion. A yet further distinguishing feature compared to Yu related to the optical performance is the use of alternative coupling devices 12 and 13 instead of Y-junction couplers. These types of modulators have been demonstrated with much higher baud rates of 40 GBd, and a capability of extending the baud rate to 80 GBd has also been shown.

It is known that intentional chirp may be generated in a series push-pull LLTWE MZM by displacing selected modulation electrodes away from the optical waveguide such that they produce substantially no phase shifting effect. Walker, U.K. Patent No. GB 2375614. A further known technique of achieving intentional chirp in a LLTWE MZM is by adding a passive capacitive element to adjust the voltage splitting of the incoming modulation signal such that the voltage is split non-equally between the two members of each electrode pair. Walker, U.K. Patent No. GB 2361071.

Other techniques for generating intentional chirp in a MZM, not necessarily related directly to the modulation electrode architecture, are known in the art. In modulators fabricated from lithium niobate ($LiNbO_3$), chirp can be produced by judicious placement of the optical waveguide relative to the fringing electric field. P. Jiang et al., "LiNbO3 Mach-Zehnder Modulators With Fixed Negative Chirp", *IEEE Photon. Tech. Lett.*, Vol. 8 (10), p. 1319, 1996. U.S. Pat. No. 5,524,076 (Rolland) teaches that chirp can be generated by adjusting the optical splitting elements such that the power is split non-equally between the two MZM arms. It has been shown that a difference in DC bias on the two modulation electrodes in a lumped element InP/InGaAsP MZM with a non-linear phase-voltage characteristic can produce chirp by creating an asymmetry in the optical modulation, especially when used in conjunction with a non-equal optical power split ratio. I. Betty et al., "An empirical model for high yield manufacturing of 10 Gb/s negative chirp InP Mach-Zehnder modulators", *Optical Fiber Communication Conference 2005, Technical Digest, OFC/NFOEC*, paper OWE5, 2005. U.S. Pat. No. 6,650,458 (Prosyk) has shown how to generate a continuously adjustable amount of chirp by nesting two parallel MZMs in an external Mach-Zehnder interferometer and diverting a variable amount of power to one or the other MZM.

All of the above techniques for generating intentional chirp fall into three categories: (i) generation of chirp due to an imbalance in the effectiveness of the modulation electrodes (referred to hereafter as "drive imbalance"); (ii) generation of chirp via a non-equal optical power split ratio between the two parallel optical paths (hereafter "power imbalance"); and (iii) generation of chirp by phase modulation separate from amplitude modulation (hereafter "tandem phase modulation"). The three categorical approaches do not produce identical effects in performance, and some of the trade-offs between (i) and (ii) have been quantified in the scientific literature.

It is the object of this invention to provide a means of generating intentional chirp which enables the performance advantages of the LLTWE MZM architecture to be combined with any and all of the above categorical methods of supplying chirp. As a further refinement of the invention, a means of adjusting the degree of power imbalance during operation is provided, therefore allowing the chirp to be tuned, and enabling a dynamic method of changing the chirp proportionality between power imbalance and other chirp generating means.

Although the preferred embodiment of the invention is a MZM with traveling wave electrodes in series push-pull configuration fabricated in InP/InGaAsP, portions of this invention are not constrained to such a MZM architecture, nor is any part of the invention constrained to the InP/InGaAsP material system. It will be obvious to practitioners skilled in the art that the simplicity and adjustability can be advantageously applied to any device where an optical input signal is divided into two or more optical signals and then recombined into one or more output signals, wherein one or more of the signals after division is modulated with an electrical signal. For MZM devices, a range of architectures is also possible. For example, a TWE MZM in parallel push-pull configuration as described by Walker et al. in U.K. Patent No. GB 2384570 could be adapted to use this invention. A Y-junction lumped element MZM with only a single modulation electrode on each arm as per FIG. 1 or FIG. 3 in the Yu patent, could be largely improved through the implementation of the adjustable loss element aspect and/or multiple electrode aspects of this invention. Alternative materials are also possible, including but not limited to $LiNbO_3$, InP/InAlGaAs, GaAs/AlGaAs.

3. Solution to the Problem

None of the prior art references discussed above disclose a TWE MZM where the transmission modulation electrodes in one arm of the waveguide have different shapes or dimensions (e.g., a shorter length or wider width) than those in the other arm of the waveguide. This configuration is capable of a controlled-chirp output signal to meet the needs of a particular telecommunications system. In particular, a negative chirp output signal can be produced.

SUMMARY OF THE INVENTION

This invention provides Mach-Zehnder modulator having an optical splitting element splitting an input optical signal into two optical signals that are conveyed by two optical waveguide arms, and an optical combining element combining the two optical signals into an output optical signal. Two traveling wave electrodes (TWEs) carry an electrical modulation signal to induce a change in phase of these two optical signals, and include a number of pairs of modulation electrodes positioned adjacent to the waveguide arms. At least some of the electrodes in one waveguide arm have a different shape (e.g., length or width) than the electrodes in the other waveguide arm to alter the effectiveness of the electrodes in inducing a phase change in the two optical signals.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 4:
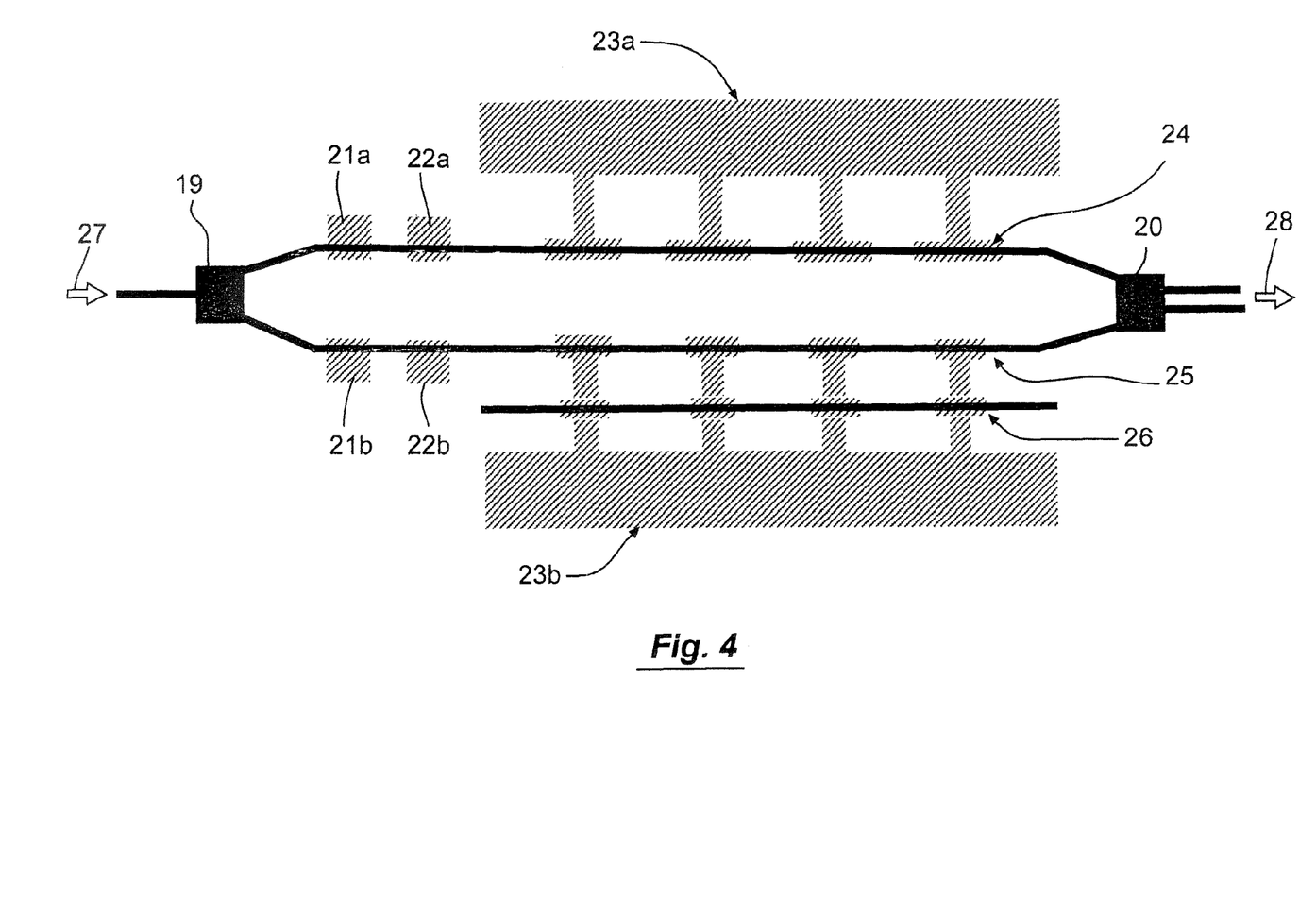
FIG. 4 is a plan view schematic diagram of an embodiment of the present invention.

The preferred embodiment of the invention is pictured in schematic plan view in FIG. 4. A three-dimensional view of one period of a modulation electrode pair is pictured in FIG. 5. Referring to FIG. 4 which relates to the TWE, modulation electrode, and optical path configuration aspects of the preferred embodiment, an input optical signal 27 is split via an input splitting device 19 into two optical paths.

DC phase adjustment elements 21 allow a DC adjustment of the relative optical phase between the two MZM arms. Variable optical loss elements 22 allow for the relative optical power in the arms to be adjusted, providing a means of adjusting the degree of power imbalance during operation, and hence the degree of power imbalance-induced chirp. Because there is a variable optical loss element in each arm, the MZM is not constrained to have one particular arm with greater power than the other, i.e., not only may the magnitude of the power imbalance be adjusted, but which of the two arms conveys the greater power may also be altered. TWE transmission line electrodes 23 are connected to individual modulation electrode periods adjacent to each arm 24 and 25. Note that the individual modulation electrodes on arm 24 are shown with greater length in the optical propagation directions than the individual modulation electrodes on arm 25, providing a drive imbalance to induce chirp. The difference in capacitive loading due to the shorter electrode lengths in one arm is compensated for by passive parallel capacitors 26.

Note that the passive capacitive loading here is distinct from the passive capacitive loading described by Walker in U.K. Patent No. GB 2361071. The present invention uses the capacitance to partially or substantially restore equal division of the modulation voltage across the modulation electrode pairs; whereas Walker teaches the opposite use of the capacitance to substantially create an imbalance in the division of the modulation voltage.

The optical power is then combined by an output combining device 20 to the exit waveguide, shown in this embodiment as an X-junction or a 2×2 multimode interference (MMI) device. The X-junction or 2×2 MMI has the advantageous property of having both bar-state and cross-state outputs. If the bar state is used as the output port of the invention, then the cross-state acts as a dump port. When the MZM is in a condition such that the light in the two MZM arms has 0 degrees phase difference in the optical carrier, they interfere such that the light exits substantially from the output port. This is referred to as the on state. Contrarily, when the light in the two MZM arms has 180 degrees phase difference in the optical carrier, the combined light exits from the dump port. This is referred to as the off state. The X-junction or 2×2 MMI is preferred over the Y-junction as a combiner used in the Yu patent, for example, because the light in the off-state is captured by the dump port waveguide and can be guided away from parasitically affecting the output port. The light in the dump port can also be used for other purposes, such as a monitor for the average optical power level, without perturbing the light in the output port. The output light beam is indicated as 28.

Figure 5:
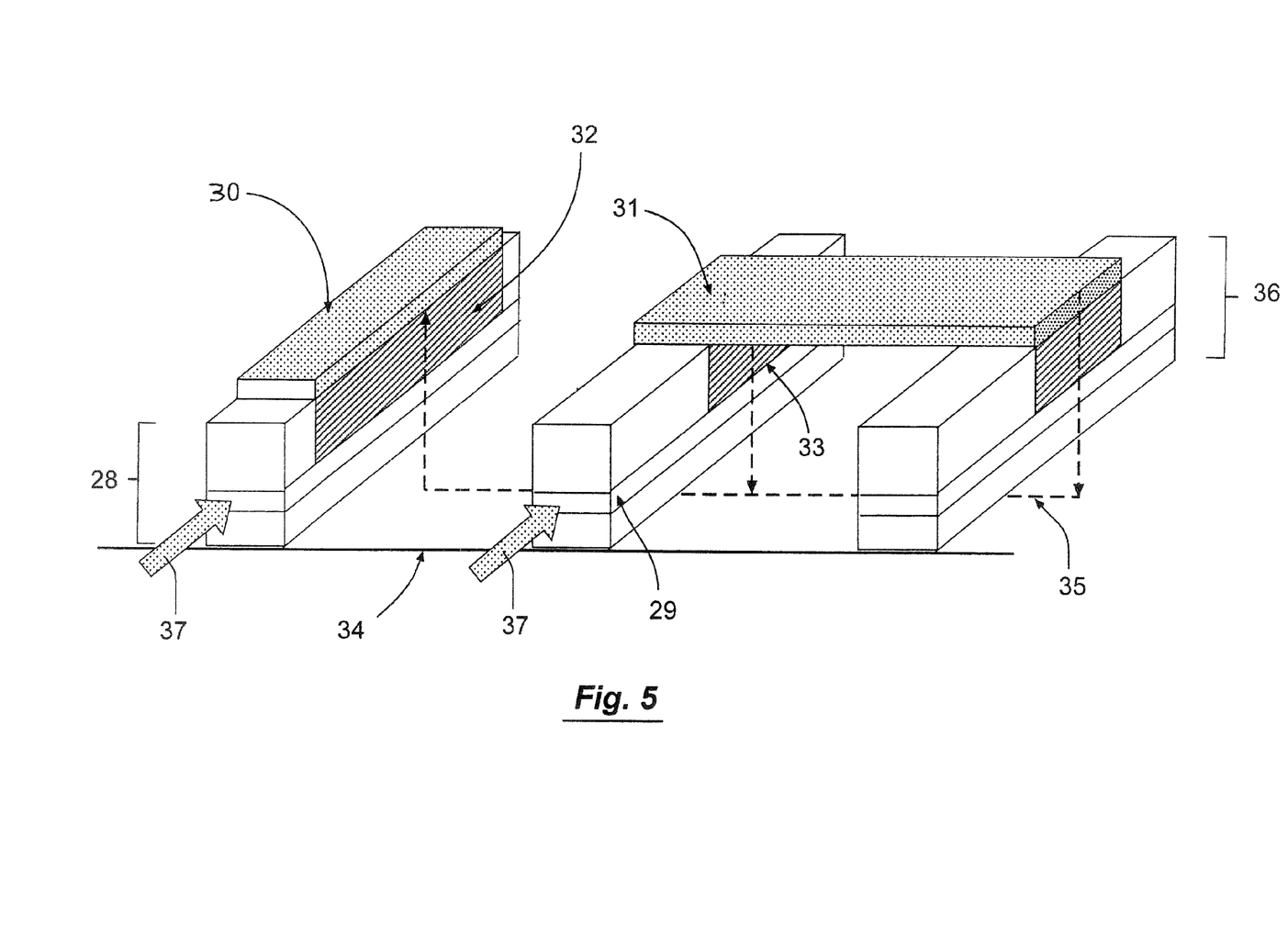
FIG. 5 is a three-dimensional view of a single period of the modulation electrodes on the two parallel optical MZM arms and the passive capacitive load.

A further aspect of the preferred embodiment is evident in FIG. 5, as relates to the series push-pull and semiconductor material nature of the embodiment. FIG. 5 shows a schematic cross-section through a single period of the modulation electrodes on the two MZM arms. The semiconductor optical waveguides 28 and light propagation 37 are shown, and an additional ridge 36 that does not guide light but is a convenient means to provide a parallel passive load capacitance as per reference numeral 26 in FIG. 4. Within the optical waveguides, a layer of non-intentionally doped or intrinsic material 29 acts to guide the optical mode. Furthermore, the guiding layer provides a means of phase modulation since in the presence of an electrical signal, it alters the optical carrier phase of the light passing through it. The electrical signal is provided to the guiding layer by the metal modulation electrodes 30 and 31. There may further be sections of waveguide above the guiding layer called the overclad. Sections 32 and 33 of the overclad are interposed between the guiding layer and the metal and are heavily p-doped to be substantially conducting, thereby enabling the electrical modulation signal to be efficiently close to the guiding layer. The region of semiconductor connecting the two MZM arms 34 is n-doped to be substantially conducting, thereby providing a back-to-back series connection between the p-i-n junctions of the two MZM waveguide arms and a common n-type connection for the passive load capacitance. If a voltage difference is present between electrodes 30 and 31 at an instant in time, owing to the presence of a modulation signal on the TWE transmission line electrodes 23 of FIG. 4, then the RF current flow path is indicated by dashed arrows 35 in opposing directions on the two optical MZM arms, to provide a series push-pull modulation of the kind described in the Walker paper cited above. Because pairs of the modulation electrodes are electrically connected in series, and each of the pair is connected to a transmission line electrode, any imbalance in capacitance caused by the imbalance in modulation electrode length, even in the absence of passive capacitive load, does not disadvantageously impact the modulator bandwidth as it would for a lumped element MZM described in the prior art above.

Figure 6:
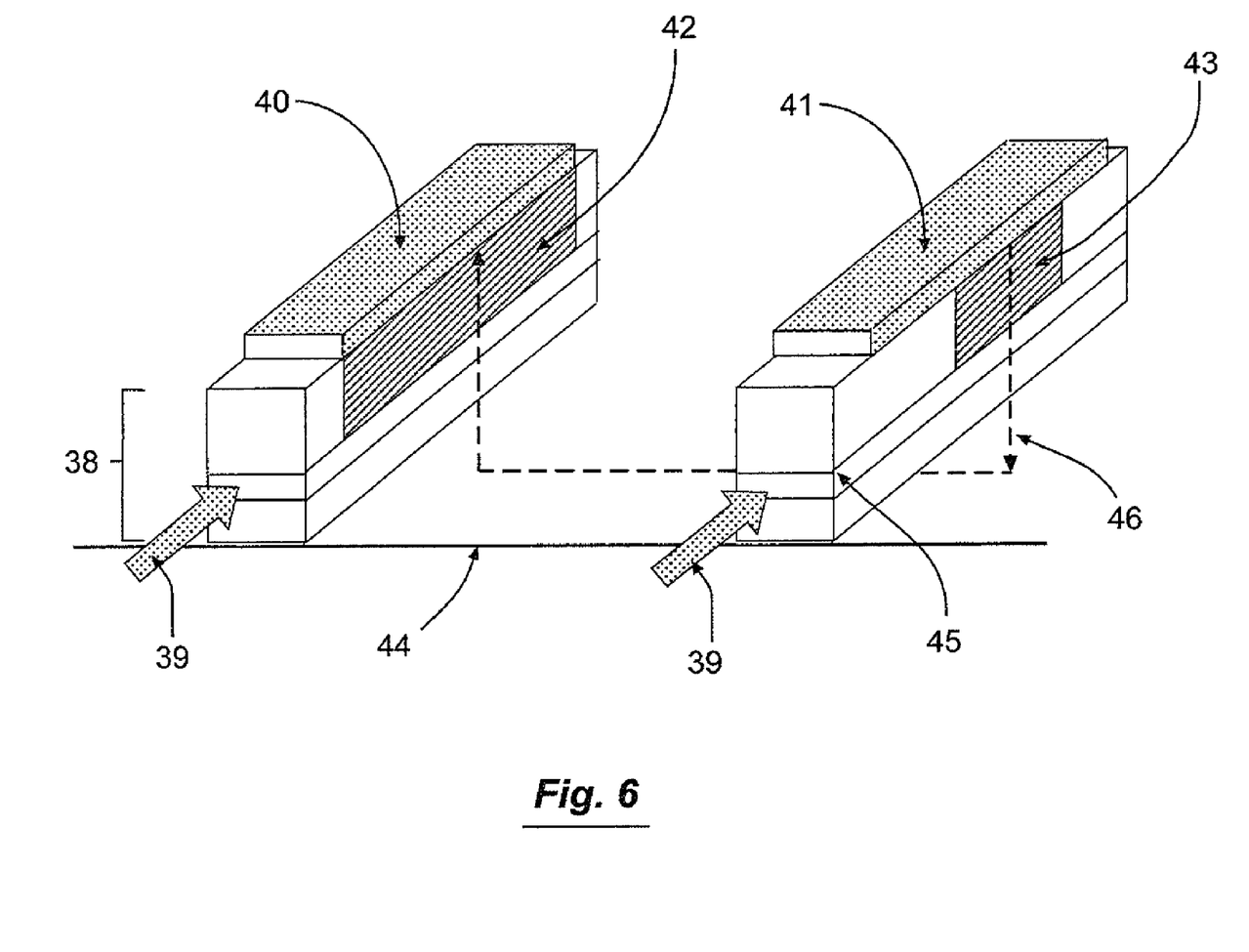
FIG. 6 is a three-dimensional view of another embodiment of the present invention in which the length of efficient modulation is controlled by the differing lengths of the p-doped regions 42 and 43.

In an alternative embodiment shown in FIG. 6, the metal electrode 40 is the same length as 41, and overlaps with a region of the waveguide which is not heavily p-doped semiconductor, and is substantially non-conducting. Here, the length of efficient modulation is controlled by the differing lengths of the p-doped regions 42 and 43. This embodiment could be used to create an imbalance in the modulation drive, yet keep the capacitance of the modulation electrode at a more balanced level, reducing or eliminating the need for the passive load capacitors. In general, the metal modulation electrodes can be adjusted to any size independent of the length of the p-doped semiconductor underneath.

Figure 7:
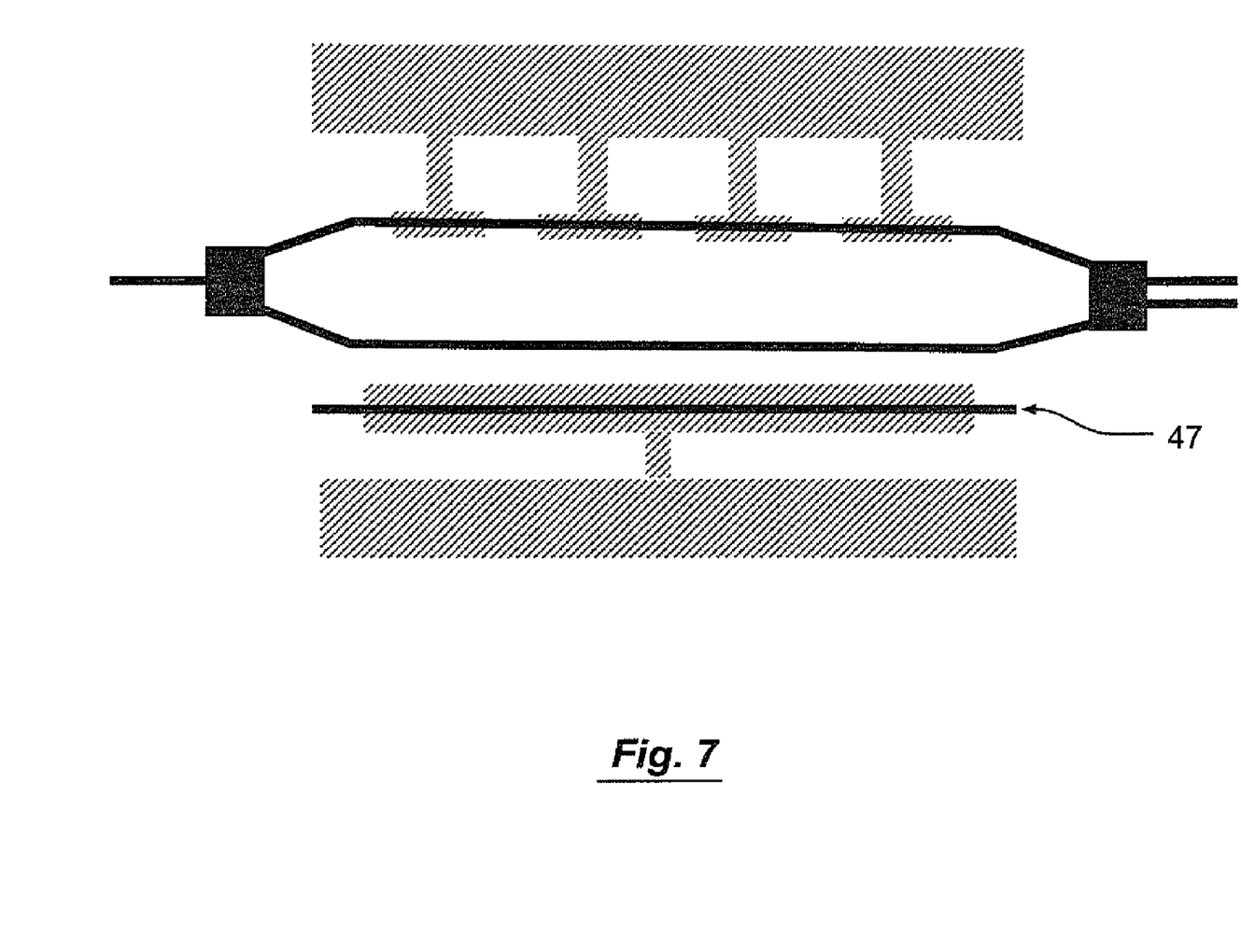
FIG. 7 is a plan view schematic diagram of another embodiment of the present invention in which the drive imbalance is taken to an extreme, where the length of the modulation electrode on one arm is essentially zero and only the second arm is modulated.

In a further alternative embodiment shown in FIG. 7, the drive imbalance is taken to an extreme, where the length of modulation electrode on one arm is zero, and only a single arm is modulated. The TWE configuration is maintained by connecting the transmission line electrode that not providing modulation to the MZM arm to the n-doped semiconductor through a large capacitor 47. Note that this capacitance may be separate from the transmission line conductor as shown in FIG. 7, or the transmission line conductor itself may form the top plate of the capacitor. In this specific embodiment, the large capacitance 47 causes the modulation voltage to be substantially across the modulated arm of the MZM.

Figure 8:
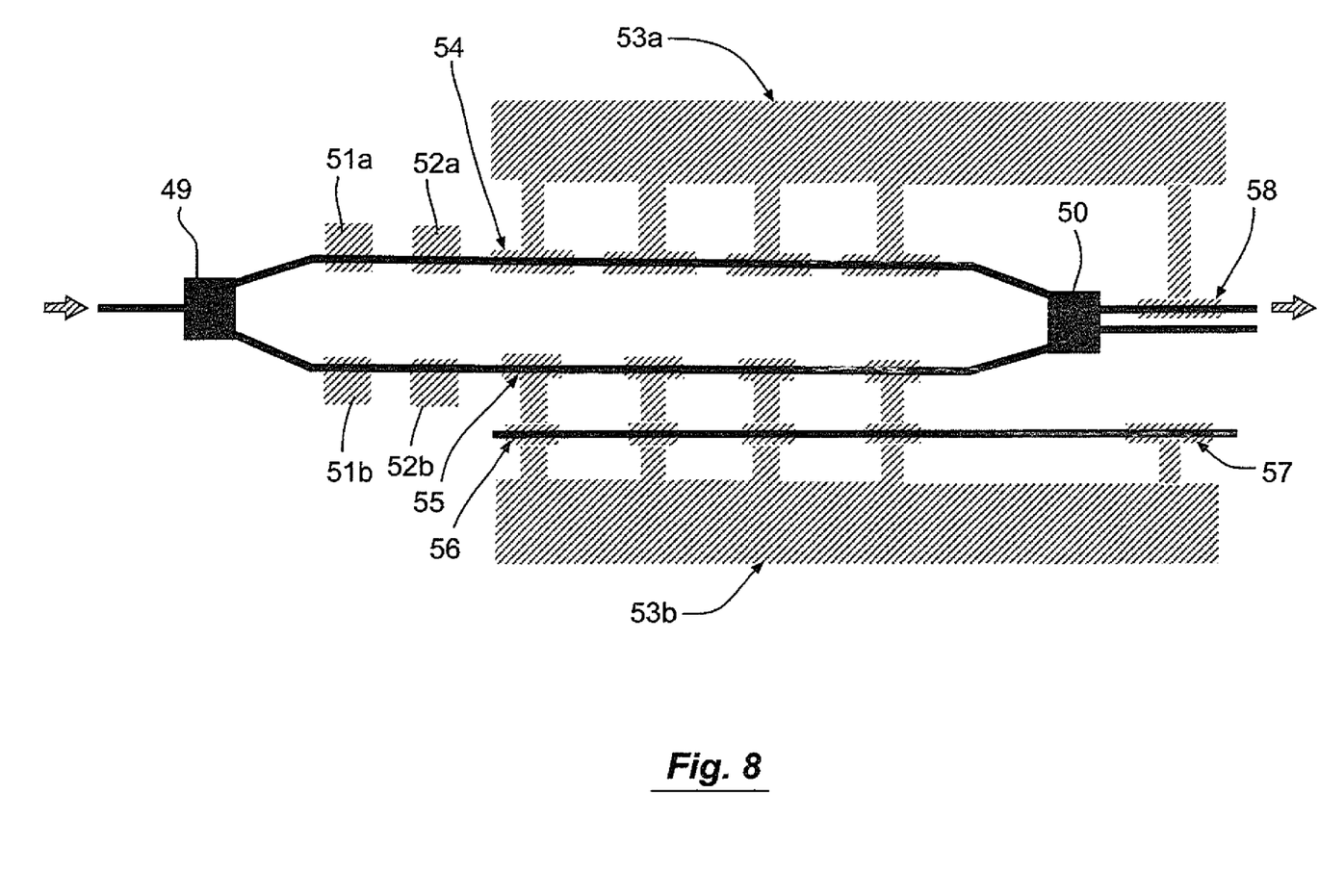
FIG. 8 is a plan view schematic diagram of another embodiment of the present invention with a tandem phase modulator electrode 58.

The electrode architecture can also be adapted to provide an advantageously balanced tandem phase modulator, as shown in a further alternative embodiment in FIG. 8. By making the phase modulation electrodes non-continuous contrary to Seino, but electrically connected to a separate transmission line, a tandem phase modulation electrode 58 can be added without all of the disadvantages of the prior art discussed above. As a further improvement, a parallel capacitor 57 can be added to restore the balance of drive voltage.

Figure 9:
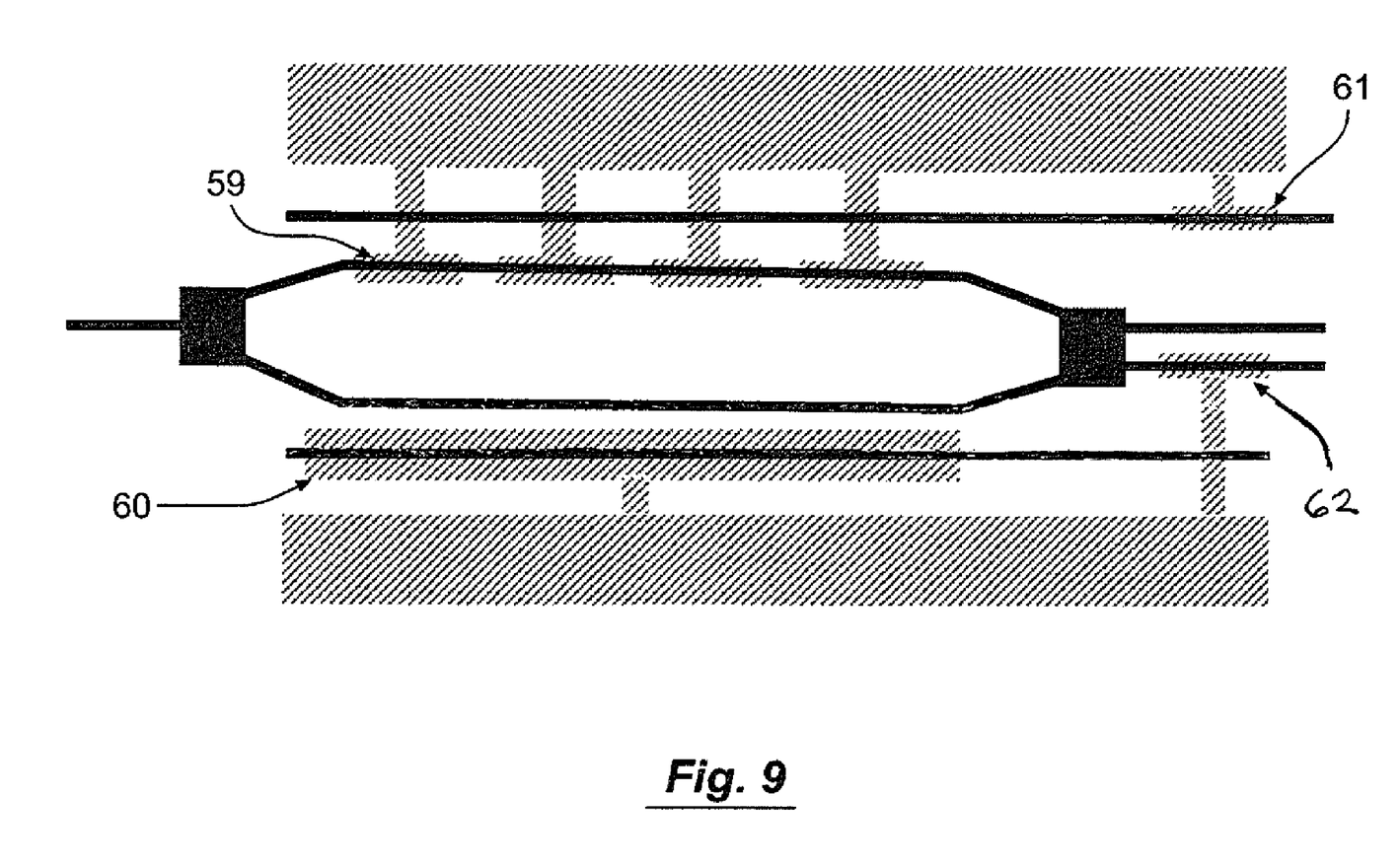
FIG. 9 is a plan view schematic diagram of another embodiment of the present invention in which a single arm is adapted for tandem phase modulation.

A yet further alternative embodiment is shown in FIG. 9, where the extreme case of single-arm modulation from FIG. 7 is advantageously adapted for tandem phase modulation. In this case, since the phase modulation electrode of the tandem phase modulator 62 is connected to the lower transmission line in the diagram, the chirp provided by the tandem phase modulator acts in opposition to the chirp provided by the MZM, thereby lowering the overall amount of chirp. As in FIG. 8, a balancing capacitor 61 may be provided In summary, a difference in the relative length of the modulation electrodes or heavily p-doped overclad sections provide a fixed drive imbalance, and the variable loss elements provide a dynamically variable power imbalance. Imbalances in the division of drive voltage due to the difference relative length of the electrodes may partially or substantially compensated for by passive-loading capacitors and/or extension of the metal electrodes beyond the heavily p-doped sections. Any disturbance to the desired DC phase difference between the MZM arms induced by the variable loss elements may be corrected for using the DC phase adjustment elements. A tandem phase modulator may be provided electrically connected to one of the transmission lines, with one or more balancing electrically connected to another transmission line may be provided to balance the voltage division.

Other variations are possible. For example, the size of modulation electrodes need not be uniform along the entire length of the waveguide. The DC phase adjustment and/or the loss elements may be omitted, or may consist of a plurality of elements achieving the same function. The loss element may be constructed by various means. In an InP/InGaAsP MZM, it is possible to use voltage-controlled direct band gap absorption to induce the variable loss. In this or other material systems, the variable loss elements could themselves be MZ interferometers embedded in the larger MZM. The semiconductor doping may by altered, for example references to p-type replaced with n-type and the provision of some current blocking layer such as Fe-doped InP or a thin layer of p-type material. The coupling means may by Y-junctions, MMI couplers, directional couplers, or other coupling means. Other functions such as optical power monitor taps may be inserted within the invention, and the invention as a whole may be combined with other devices. It should be noted that the specific implementation of these and other portions of the invention are possible by a variety of means to those practitioners skilled in the art.

Figure 10:
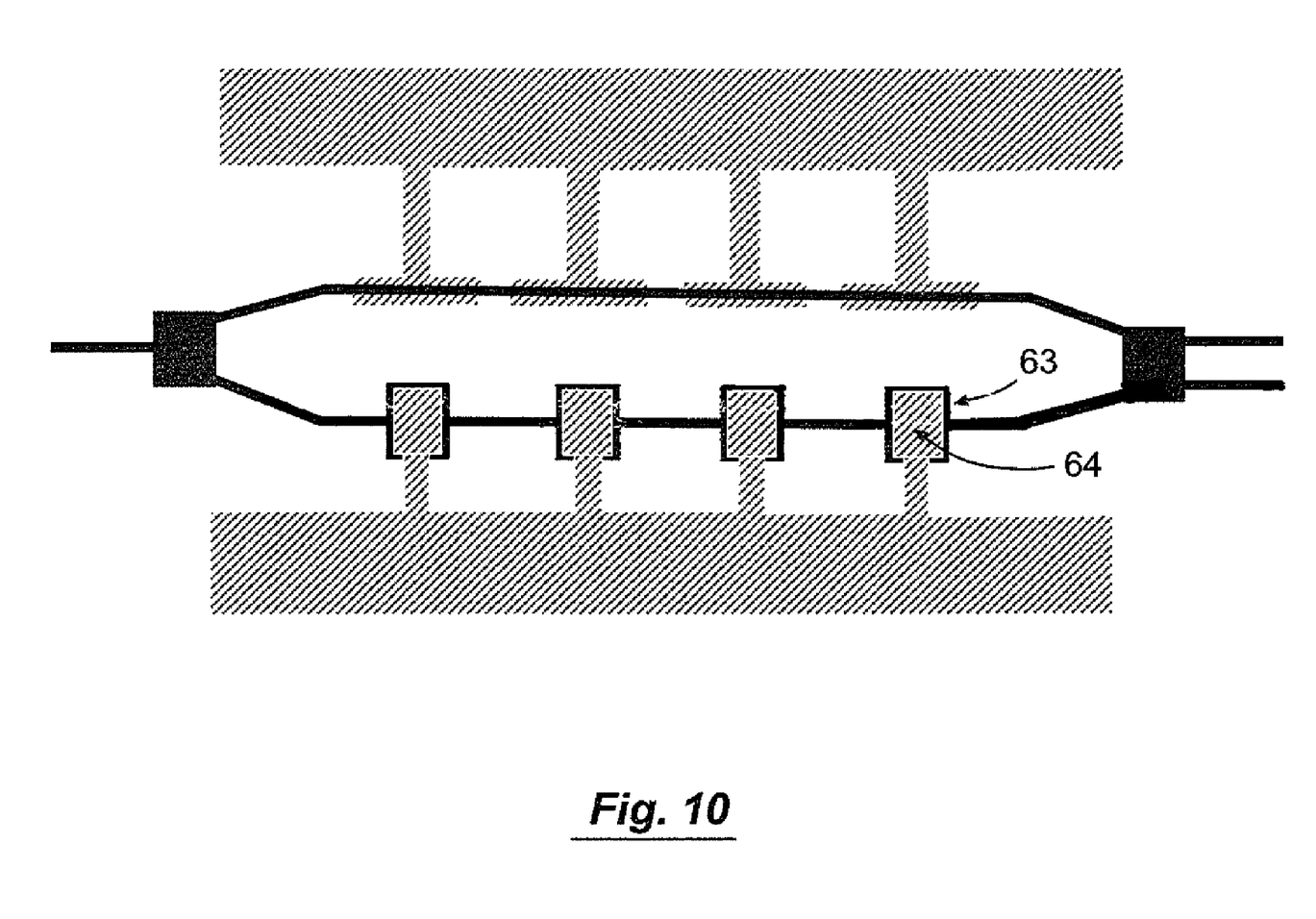
FIG. 10 is a plan view schematic diagram of another embodiment of the present invention having a waveguide arm that is wider in some regions 63.

FIG. 10 shows yet another embodiment of the present invention in which one waveguide arm is wider in a region or some regions 63. These wider regions 63 may be multimode interference regions with a single input and single output. A wider modulation electrode 64 is placed adjacent to a wider waveguide arm region. Wider electrodes have higher capacitance per unit length. This embodiment can be fashioned such that the wider electrodes have substantially higher capacitance than the electrodes on the other MZM arm. The input RF voltage will then be divided unequally, with more voltage across the narrower electrode or electrodes, thus providing a drive imbalance to generate chirp based on RF voltage imbalance.

Alternatively, the wider regions may have electrodes which are shorter than the electrodes on the other MZM arm, such that they have substantially the same capacitance as narrower electrodes. In this case, the voltage is divided equally between the two arms, but the arm with the longer electrodes provides more modulation because of the longer interaction length, thus providing an alternative drive imbalance to generate chirp based on modulation efficiency. Of course, the combined case is also possible, wherein the wider regions in one MZM arm have both shorter length and higher capacitance, leading to higher drive imbalance which relies both on voltage imbalance and modulation efficiency imbalance.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A Mach-Zehnder modulator comprising:
    an optical splitting element splitting an input optical signal into first and second optical signals;
    a first optical waveguide arm conveying the first optical signal;
    a second optical waveguide arm conveying the second optical signal;
    an optical combining element combining the first and second optical signals into an output optical signal;
    first and second traveling wave electrodes (TWEs) carrying an electrical modulation signal to induce a change in phase of the first and second optical signals, said first and second TWEs having a plurality of pairs of first and second electrodes positioned adjacent to the first and second optical waveguide arms, respectively;
    wherein at least one of the first electrodes has a different shape than the second electrode of the pair.

2. The Mach-Zehnder modulator of claim 1 wherein the first electrode has a different length than the second electrode.

3. The Mach-Zehnder modulator of claim 1 wherein first electrode has a different width than the second electrode.

4. The Mach-Zehnder modulator of claim 1 wherein first electrode has a different capacitance than the second electrode.

5. The Mach-Zehnder modulator of claim 1 wherein first electrode has a higher capacitance and a shorter length than the second electrode.

6. The Mach-Zehnder modulator of claim 1 wherein at least one of the pairs of electrodes are electrically connected in series.

7. The Mach-Zehnder modulator of claim 1 wherein at least one of the pairs of electrodes further comprises a parallel capacitive element to modify the division of the modulation voltage between the electrodes to be more evenly divided.

8. The Mach-Zehnder modulator of claim 1 further comprising:
    an input optical waveguide connected to the optical splitting element;
    an output optical waveguide connected to the optical combining element; and
    a tandem phase modulation electrode adjacent to one of the optical waveguides connected to one of the TWEs to modulate the phase of the optical signal.

9. The Mach-Zehnder modulator of claim 8 wherein the TWE that is not providing tandem phase modulation is electrically connected in series to the TWE providing tandem phase modulation by a capacitive element.

10. The Mach-Zehnder modulator of claim 1 wherein the optical waveguide arms further comprise:
    guiding layers to guide the optical signals; and
    sections of conductive overclad material interposed between the electrodes and guiding layers, wherein at least one of the overclad sections has a different length than the electrode adjacent to the overclad section.

11. The Mach-Zehnder modulator of claim 1 further comprising a variable loss element in a waveguide arm to adjust the magnitude of optical loss.

12. The Mach-Zehnder modulator of claim 1 further comprising a DC phase adjustment element in a waveguide arm.

13. The Mach-Zehnder modulator of claim 1 wherein the optical splitting element comprises a multimode interference coupler.

14. The Mach-Zehnder modulator of claim 1 wherein the optical combining element comprises a multimode interference coupler.

15. A Mach-Zehnder modulator comprising:
    an optical splitter splitting an input optical signal into first and second optical signals;
    a first optical waveguide arm conveying the first optical signal;
    a second optical waveguide arm conveying the second optical signal;
    an optical combining element combining the first and second optical signals into an output optical signal;
    first and second traveling wave electrodes (TWEs) carrying an electrical modulation signal to induce a change in phase of the first and second optical signals; said first and second TWEs having a plurality of pairs of first and second electrodes positioned adjacent to the first and second optical waveguide arms, respectively;
    wherein at least one of the first electrodes has a different shape than the second electrode of the pair, and wherein the second TWE is connected in series to the electrodes of the first TWE by a capacitive element.

16. The Mach-Zehnder modulator of claim 15 wherein the first electrode has a different length than the second electrode.

17. The Mach-Zehnder modulator of claim 15 wherein the first electrode has a different width than the second electrode.

18. The Mach-Zehnder modulator of claim 15 wherein the first electrode has a different capacitance than the second electrode.

19. The Mach-Zehnder modulator of claim 15 further comprising:
    an input optical waveguide connected to the optical splitting element;
    an output optical waveguide connected to the optical combining element; and
    a tandem phase modulation electrode adjacent to one of the optical waveguides connected to one of the TWEs to modulate the phase of the optical signal.

20. The Mach-Zehnder modulator of claim 15 wherein the optical waveguide arms further comprise:
    guiding layers to guide the optical signals; and
    sections of conductive overclad material interposed between the electrodes and guiding layers, wherein at least one of the overclad sections has a different length than the electrode adjacent to the overclad section.

* * * * *